May 22, 1956  I. W. MILLS  2,746,875
WAX COMPOSITION
Filed Feb. 13, 1953
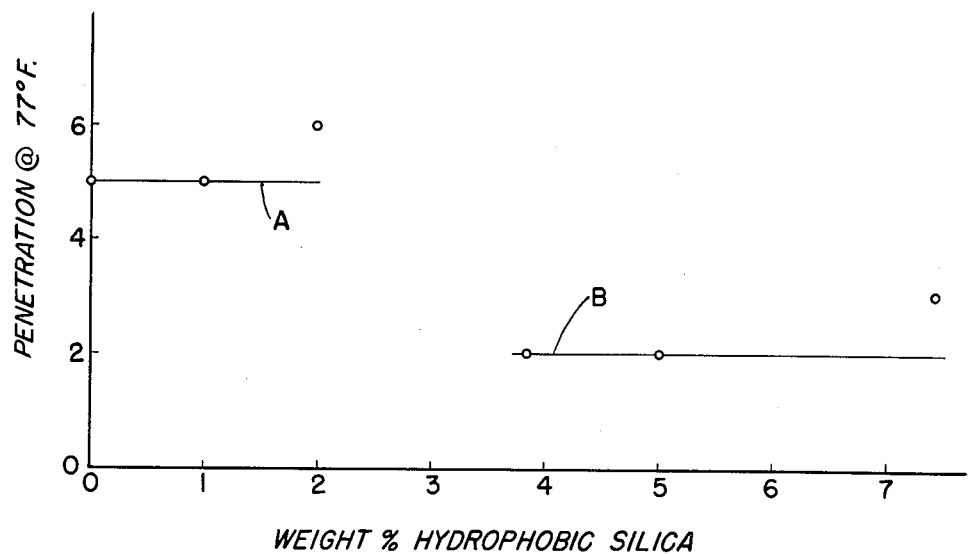
INVENTOR.
IVOR W. MILLS
BY
Robert O. Spindle
ATTORNEY United States Patent Office 2,746,875
Patented May 22, 1956

2,746,875
WAX COMPOSITION

Ivor W. Mills, Glenolden, Pa., assignor to Sun Oil Company, Philadelphia, Pa., a corporation of New Jersey Application February 13, 1953, Serial No. 336,864

3 Claims. (Cl. 106—272)

This invention relates to petroleum wax compositions particularly suitable for use in compounding emulsion polishes.

The preparation of emulsion polishes for use on floors and other surfaces is well known. Compositions of this kind generally comprise a natural, synthetic or petroleum wax emulsified in water by means of a suitable emulsifying agent which is usually an amine soap such as a triethanolamine or morpholine soap of stearic, oleic, linoleic, lauric, palmitic or other organic acid. When the emulsion is applied to a surface, the water evaporates leaving a waxy film which imparts gloss to the surface. The durability of this film depends upon the hardness of the wax used in preparing the compositon. For surfaces such as floors which are subject to scuffing, it is particularly desirable that the wax-containing film be of sufficiently hard character to withstand for a reasonably long time the usual wear to which the surface is subjected.

The present invention involves the use of petroleum microcrystalline wax in the preparation of emulsion polishes and it provides a means of making a harder wax composition having greater durability when applied as a surface film. The microcrystalline wax employed should initially be one which is relatively hard as indicated by a penetration of less than 10 at 77° F. (A. S. T. M. method No. D217–44T.) Preferably the wax is one which has a melting point of 185–195° F. and an initial penetration of 4–6.

According to the invention, a wax composition substantially harder than the original microcrystalline wax is prepared by incorporating into the wax a minor amount of colloidal hydrophobic silica. The particle size of the silica should be such that the average diameter is less than 0.1 micron. The silica must have been prepared in a way so that it is hydrophobic or water-proof, as more fully discussed hereinafter. The amount of silica incorporated into the wax should be above a more or less critical concentration in order to secure the desired increase in hardness.

It has now been found that when finely divided silica, as specified above, is added to a microcrystalline wax having a penetration less than 10, the penetration remains essentially the same as the silica in initially added and then suddenly decreases substantially when a certain concentration of silica is reached. Thereafter, further additions of the silica have no apparent effect on the penetration. For example, as the hydrophobic silica is added to a microcrystalline wax having an initial penetration in the range of 4–6, the penetration will remain essentially the same up to a certain minor percentage addition, whereupon the penetration will suddenly drop to 2–3 and will remain at that level as more silica is added. However, in spite of the sudden increase in hardness as measured by the penetration test, the melting point will remain essentially the same as that of the original wax.

This unexpected behavoir is illustrated in the accompanying drawing which shows the effect on penetration of adding silica to a microcrystalline wax having a melting point of 193° F. and a penetration of 5. Penetrations were determined for compositions containing hydrophobic silica (particle size about 0.01 micron) in the following amounts: 0.99%, 1.96%, 3.85%, 5.0% and 7.4% by weight. In considering the results as shown in the drawing, it should be kept in mind that penetration values within one unit of each other are check results within the limit of accuracy of the test. Thus, up to an amount of at least 1.96% silica, the penetration remained essentially unchanged at a level of about 5 as shown by the upper horizontal line A. At some concentration between 1.96 and 3.85, the penetration dropped to a value of about 2 and then remained at this level, as indicated by the lower horizontal line B, up to at least the maximum amount of silica tried (7.4%). All of the blends had essentially the same melting point as the original wax. The exact silica content at which the penetration decreased was in this case not specifically determined. This critical concentration would be expected to vary somewhat dependent upon the particular wax used and the size of the silica particles incorporated in the wax, but in general it will be found to lie within the range of 2–6% silica by weight.

As previously stated, the silica used in practicing the invention should be hydrophobic or water repellant. Since silica normally is hydrophilic, the silica generally should be subjected to a suitable special treatment prior to incorporation in the wax in order to meet this requirement. Any known or suitable method for rendering the silica hydrophobic may be used for this purpose. For instance, the silica may be treated with a silane compound as described in Hirschler Patent 2,614,135; or it may be treated with an alkyd resin or an organo silicon polymer as described in Sirianni et al. Patents 2,583,605 and 2,583,606. Other procedures for preparing hydrophobic silica, such as that described in Montenyold et al. Patent 2,614,993, likewise may be employed. The use of hydrophobic silica in accordance with the present invention results in a wax-silica composition having not only lower penetration but also the advantage of being unaffected by the water phase of the emulsion polish into which it is incorporated.

Various polishing compositions of the prior art have included silica dust as an abrasive component. The hydrophobic silica employed in the present compositions is of such small particle size as to be completely non-abrasive, its use being for an entirely different purpose, namely, to effect a sharp increase in the penetration of the microcrystalline wax into which it is incorporated.

I claim:

1. A wax composition comprising mainly a microcrystalline petroleum wax having a penetration less than 10 at 77° F. and having incorporated therein colloidal hydrophobic silica of particle size less than 0.1 micron in minor amount within the range of about 2 to 6% by weight based on the mixture, but sufficient to substantially reduce the penetration.

2. A wax composition comprising mainly a microcrystalline petroleum wax having a melting point of 185–195° F. and a pentration of 4–6 at 77° F. and having incorporated therein finely divided hydrophobic silica of particle size less than 0.1 micron in minor amount within the range of about 2 to 6% by weight based on the mixture, but sufficient to reduce the penetration to 2–3.

3. A wax composition consisting essentially of a microcrystalline petroleum wax having a melting point of 185–195° F. and a penetration less than 10 at 77° F. in admixture with colloidal hydrophobic silica in amount, within the range of 2–6% by weight based on the mixture, sufficient to substantially reduced the penetration.

References Cited in the file of this patent

UNITED STATES PATENTS

| | | |
|---|---|---|
| 2,559,398 | Capell | July 3, 1951 |
| 2,567,315 | Bidaud et al. | Sept. 11, 1951 |
| 2,597,871 | Iler | May 27, 1952 |
| 2,601,291 | Horning et al. | June 24, 1952 |
| 2,614,049 | Swanson | Oct. 14, 1952 |
| 2,614,994 | Balthis | Oct. 21, 1952 |